UNITED STATES PATENT OFFICE.

FREDERIC C. DOOLITTLE, OF WATERVILLE, NEW YORK.

INTERNAL REMEDY.

SPECIFICATION forming part of Letters Patent No. 632,552, dated September 5, 1899.

Application filed February 21, 1898. Serial No. 671,165. (Specimens.)

*To all whom it may concern:*

Be it known that I, FREDERIC C. DOOLITTLE, of Waterville, in the county of Oneida and State of New York, have invented a new and Improved Composition of Matter, of which the following is a specification.

My invention is in the nature of a new composition of matter for the use of brewers in brewing beer and also for use as a medicine; and it consists in a moist and gummy composition consisting of semifluid extract of hops and lupulin powder. Hop extract, which is a well-known article on the market, is a black viscous tarry-like paste derived by concentration from a liquid solution of hop-leaves. Lupulin powder is a yellow aromatic substance which sifts out from the leafy fruit of the hop. These are the two useful agents which exist in fresh hops and whose properties are desirable in brewing. Fresh hops rapidly depreciate, however, from age as does also the aromatic lupulin powder. My invention is designed to make a staple compound which shall not only preserve indefinitely the useful properties of these two reagents, but which will permit of the utilization of a depreciated lupulin powder at nearly, if not quite, its original value when fresh. To this end it consists in combining the viscid hop extract with the lupulin powder to form a moist thick paste, in which the aromatic particles are hermetically sealed against evaporation and depreciation and in which the moisture of the hop extract lends itself to the lupulin powder to soften it by its kindred juices, even when said powder has become dried and impossible of solution in the operation of brewing.

That the commercial value of my invention may be better understood, I would state that the present market price of new hops is eighteen cents per pound and old ones six cents. Old lupulin powder is also about one-third the price of new, and when it is remembered that by my process the old lupulin powder may be regenerated and made nearly, if not fully, equal to the fresh and that after being hermetically sealed in the plastic mass there is scarcely any depreciation the value of my compound becomes apparent.

In carrying out my invention I take of semifluid hop extract five parts, by weight, and hop lupulin powder seven and one-half parts by weight. These proportions may, however, be modified so as to use more or less of the lupulin powder, according to circumstances.

In preparing the composition the lupulin powder is thoroughly mixed with the semifluid hop extract, and the mass is then worked into cakes for the use of brewers and into pills for medicine. These pills are taken internally and readily dissolve in the stomach, and their therapeutic effect is that of a tonic and sedative for quieting unduly-excited nerves.

I am aware that a composition of matter known as "normal hops" has heretofore been prepared, which consisted of lupulin powder and an extract from the hop-leaves, which was evaporated to dryness and then powdered and mixed with the lupulin. In this product, however, the lupulin was not hermetically sealed, because the extract was a dry powder and not a moist paste, and for that reason it had to be kept in air-tight receptacles, and, furthermore, the compound could not rejuvenate and restore to solubility the depreciated lupulin powder, because there was no moisture in the hop extract. It will therefore be seen that in my compound there is a correlated function between the moist hop extract and the lupulin powder in that the lupulin gives its aromatic values to the hop extract, and the moist hop extract in turn hermetically seals the particles of lupulin and protects it against evaporation and depreciation and also by lending its kindred juices to the dried out and depreciated lupulin powder rejuvenates and restores it and renders it a soluble and useful product.

Another great advantage of my product is that it is not put up in expensive air-tight packages, but is cheaply wrapped in paraffin-paper and tin-foil.

Having thus described my invention, what I claim, and desire to secure by Letters Patent, is—

The herein-described composition of matter consisting of semifluid hop extract and lupulin powder in about the proportions specified, incorporated together in the form of a paste substantially as described.

FREDERIC C. DOOLITTLE.

Witnesses:
A. W. DOOLITTLE,
C. G. BRAINARD.